United States Patent Office 3,575,969
Patented Apr. 20, 1971

3,575,969
DESACETOXYCEPHALOSPORIN ANTIBIOTICS
Robert B. Morin and Billy G. Jackson, Indianapolis, Ind.,
assignors to Eli Lilly and Company, Indianapolis, Ind.
No Drawing. Continuation-in-part of application Ser. No.
579,222, Sept. 14, 1966, which is a continuation-in-part
of application Ser. No. 213,588, July 31, 1962. This
application Mar. 4, 1968, Ser. No. 709,927
The portion of the term of the patent subsequent to
Apr. 21, 1987, has been disclaimed
Int. Cl. C07d 99/24
U.S. Cl. 260—243    3 Claims

ABSTRACT OF THE DISCLOSURE

Desacetoxycephalosporin antibiotics containing thienyl or furyl rings in the 7-acylamido moiety of the molecule, e.g., 7 - ($\alpha$ - amino - $\alpha$ - thienylacetamido) - 3 - methyl-$\Delta^3$-cephem-4-carboxylic acid, and pharmaceutically acceptable salts thereof.

CROSS-REFERENCES TO PRIOR APPLICATIONS

This application is a continuation-in-part of our application Ser. No. 579,222, filed Sept. 14, 1966, now Patent No. 3,507,861, which is a continuation-in-part of application Ser. No. 213,588, filed July 31, 1962, now Patent No. 3,275,626.

BACKGROUND OF THE INVENTION

The present invention relates to antibiotic substances. More particularly it relates to certain penicillin derived antibiotic substances and to novel methods for their production.

The first of the antibiotics to be discovered were the penicillins, which contain the penam nucleus, a thiazolidine ring with a fused $\beta$-lactam. A more recent discovery is the cephalosporins, which contain the $\Delta^3$-cephem nucleus, a dihydrothiazine ring with a fused $\beta$-lactam. These two classes of antibiotics are thus somewhat related in structure, as will be seen from the following general structural formulas:

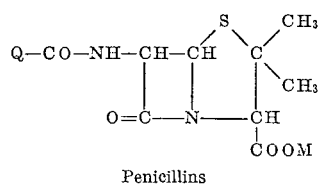

Penicillins

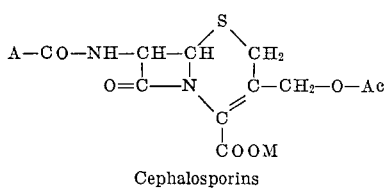

Cephalosporins wherein Q represents essentially any organic radical, as exemplified by hundreds of examples in the prior art, and M represents a pharmaceutically acceptable cation. The penam nomenclature for the penicillins is described by Sheehan, Henery-Logan, and Johnson in the J. Am. Chem. Soc., 75, 3293, footnote 2 (1953), and has been adapted to the cephalosporins by Morin, Jackson, Flynn, and Roeske in the J. Am. Chem. Soc., 84, 3400 (1962). In accordance with these systems of nomenclature, "penam" and "cepham" refer respectively to the following saturated ring structures:

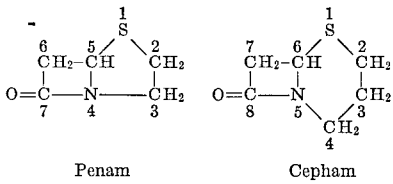

Penam       Cepham while "cephem" refers to the cepham ring structure with a double bond, the position of which is indicated by a prefixed "$\Delta$" with superscript denoting the carbon atom of lowest number to which the double bond is connected.

While both the penicillins and the cephalosporins have been remarkably effective in the treatment of a variety of infections, there is a continuing need for different and improved antibiotics. There has also been a need for a simple and economical method for synthesizing the cephalosporin compounds from available starting materials.

One object of the present invention is to prepare novel antibiotic substances.

Another object is to prepare modified cephalosporins.

Other objects of the invention and its advantages over the prior art will be apparent from the following description, operating examples, and claims.

SUMMARY OF THE INVENTION

In one aspect, the present invention affords a novel class of compounds having the following structure:

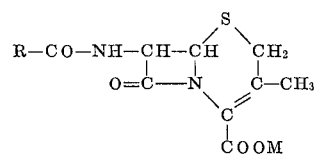

where R has the structure

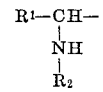

$R^3$—O—CH$_2$—, or $R^3$—S—CH$_2$— where $R^1$ is thienyl, furyl, benzothienyl, or benzofuryl;
$R^2$ is hydrogen or methyl; and
$R^3$ is a member of the same group as $R^1$, the various rings having optionally one or more substituents such as halo, alkyl, nitro, amino, acyl, trifluoromethyl, alkoxy, alkylmercapto, and the like, and M represents a pharmaceutically acceptble cation such as hydrogen, sodium, potassium, and amine cations such as monoethanolamine, diethanolamine, 1,4-bis(aminomethyl)cyclohexane and the like, or denotes an inner salt with the amino group of R, when R has the structure

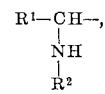

When the product contains alpha-amino groups and carboxyl groups, it will be apparent that the product can exist in the form of the inner salt or as a salt of a pharmaceutically acceptable acid, or the like and such salt forms are considered to lie within the scope of the invention as claimed.

Thus, R may be chosen from the following types of structures:

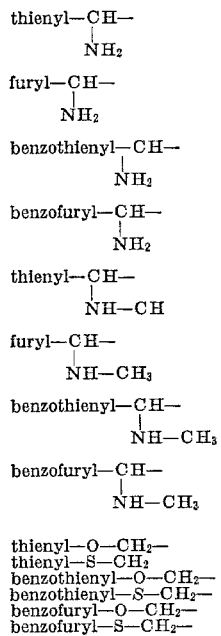

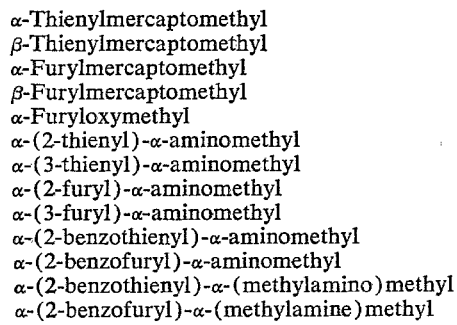

Illustrative cephalosporin products include, but are not limited to, the following, referring only to the R group thereof, attached through —CO—NH— to the antibiotic nucleus:

α-Thienylmercaptomethyl
β-Thienylmercaptomethyl
α-Furylmercaptomethyl
β-Furylmercaptomethyl
α-Furyloxymethyl
α-(2-thienyl)-α-aminomethyl
α-(3-thienyl)-α-aminomethyl
α-(2-furyl)-α-aminomethyl
α-(3-furyl)-α-aminomethyl
α-(2-benzothienyl)-α-aminomethyl
α-(2-benzofuryl)-α-aminomethyl
α-(2-benzothienyl)-α-(methylamino)methyl
α-(2-benzofuryl)-α-(methylamine)methyl One method for preparing the compounds of the present invention is through the acid catalyzed heat rearrangement of a penicillin sulfoxide to obtain the cephalosporin antibiotics of this invention. One should use the penicillin sulfoxide in the form of an ester or amide in order to avoid loss of the carboxyl group in the 4 position of the resulting cephalosporin. Those cephalosporin products that contain alpha-amino-acyl substituents are derived from the corresponding 7-(alpha-amino-acylamido)penicillins in which the alpha-amino group has been protected with a cleavable N-blocking function. As the first step, a penicillin having the desired 6-acylamido substituent group is first subjected to treatment with an oxidizing agent such as metaperiodic acid to produce the corresponding penicillin sulfoxide, and the penicillin sulfoxide is then converted to the corresponding penicillin sulfoxide ester to protect the carboxyl group, such as by reaction with diazomethane on the 6-acylamidopenicillin acid. Where there is an amino group in the 6-acylamido side chain, the amino group has been previously protected with a suitable blocking group. The resulting 6-acylamidopenicillin sulfoxide ester then heated to elevated temperature in the presence of an acidic substance such as acetic anhydride or sulfuric acid or the like, thereby producing the desired substance.

The acid substance can be employed in catalytic proportions, of the order of 1 to 10 percent by weight of the penicillin sulfoxide, where the acid substance does not supply an element of the desired product.

No solvent or other liquid medium is necessary for the reaction, but is desirable in order to facilitate heat transfer and to moderate the reaction. Any organic liquid can be used as the reaction medium so long as it is substantially inert to the other reactants under the conditions employed. A preferred solvent and acid reactant combined is acetic anhydride. The reaction temperature should lie in the range of about 100 to about 175° C., preferably about 125 to about 150° C. The conversion is generally found to reach a substantial level after as little as 5 minutes, and is ordinarily complete in less than one hour. The reaction time should be kept as short as possible in order to minimize the formation of undesirable by-products.

After completion of the reaction, the reaction mixture is cooled, and the solvent, if any, is stripped off at reduced pressure. The residue obtained thereby is separated into its components by any convenient method, such as chromatography over silica gel or the like, employing a ketonic solvent for the elution. Other absorbent solids may be employed as desired, such as silica-alumina, cellulose, Florisil, or the like. For the solvent, methyl isobutyl ketone, methyl ethyl ketone, or acetone can be employed, diluted to some extent with a nonpolar solvent such as hexane, cyclohexane, or benzene, and preferably containing at least some proportion of water, up to the saturation level. The crude substance is first dissolved in an organic solvent such as the eluting solvent to be used thereafter, which solution is applied to the chromatographic column. Elution is then carried out, the eluate fractions being checked by thin-layer chromatography to identify the products in the successive fractions. The appropriate fractions are combined and are further treated to isolate the individual products, suitably by crystallization.

The free acids and salts of the products of the invention can be obtained from the esters or amides by selective hydrolysis in a conventional manner, or from suitable esters by catalytic hydrogenolysis.

The 3-methyl-7-(α-amino-heterocyclic-(acetamido)-$\Delta^3$-cephem-4-carboxylate compounds of this invention can also be prepared by acylation of 7-aminodesacetoxycephalosporanic acid (7-ADCA) or a salt, ester, or amide thereof by known methods, e.g., as described in U.S. Pat. 3,207,755, issued Sept. 21, 1965, with an acylating agent of the selected α-amino-heterocyclic-acetic acid or an acid halide or mixed anhydride thereof in which the α-amino group is protected in the conventional manner with a blocking group such as carbobenzoxy, carballyloxy, tert-butoxycarbonyl, β - oxoalkylidene, furfuryloxycarbonyl, adamantyloxycarbonyl, or the like. In a typical procedure, 7-ADCA together with a sufficient quantity of sodium bicarbonate or other appropriate alkali, preferably to maintain the pH of the mixture between 5 and 9 and to promote salt formation and solution is dissolved in aqueous 50 volume-percent acetone, the concentration of the 7-ADCA being up to about 4 percent by weight. The solution is cooled to around 0° C. to 5° C. and the solution of the protected acylating reagent is added in about 20 percent excess, with stirring and cooling. The pH of the mixture can be maintained, if it tends to vary, around the neutral level (pH 6 to 7.5) by adding sodium bicarbonate thereto or bubbling carbon dioxide therein. After addition of the acylating agent has been completed, stirring of the reaction mixture is continued, and the mixture is allowed to warm to room temperature. Organic solvents are removed in vacuo and replaced with water. The reaction mixture is then acidified to around pH 2 with hydrochloric acid or another appropriate acid to form the freeacid of the cephalosporin derivative, which can then be extracted from the reaction mixture by conventional methods, e.g., with an organic solvent such as ethyl acetate. In preparing 7-(heterocyclicacylamido)-7-ADCA derivative products not containing an alpha-amino in the acylamido group the organic solvent mixture containing the product is adjusted to around pH 5.5 with an alkaline material in an aqueous medium such as sodium hydroxide, potassium hydroxide, ammonium hydroxide, or a suitable amine solution, or a base containing sodium, potassium, ammonium, monoethanolamine, diethanolamine, or other pharmaceutically acceptable cation as desired, and is extracted with water. The products of this invention containing free amino groups and carboxylic groups can also be recovered and used in the form of the betaine, or zwitterion; i.e., an "inner salt." These compounds also form cationic salts with strong acids, i.e., acid addition salts wherein the 7-($\alpha$-amino-heterocyclicacetamido)-desacetoxycephalosporanic acid is the cation and the anion of the strong acid forms the anion of the salt. A few examples of such acids which may be used to form such salts include hydrochloric, sulfuric, phosphoric, nitric, hydrobromic, thiocyanic acids. Some of such salts, such as the hydrochloride salt increase, the water solubility of the cephalosporin antibiotic, and in such cases may be the preferred form of administration. Other of such acid salts are suitable forms for extracting the cephalosporin antibioltic from a reaction mixture into an aqueous form, from which the desired cephalosporin antibiotic in zwitterion or anionic form can be regenerated for administration. Examples of such acid salts include 3-methyl-7-($\alpha$-amino-2'-thienylacetamido)-$\Delta^3$-cephem-4-carboxylic acid hydrochloride 3-methyl-7-($\alpha$-amino-2'-furylacetamido)-$\Delta^3$-cephem-4-carboxylic acid·nitrate 3-methyl-7-($\alpha$-amino-2'-thienylacetamido)-$\Delta^3$-cephem-4-carboxylic acid·sulfate, and the like.

The water solution containing the cyclic acetamido 7-ADCA derivative as an anion or cation in the salt form is separated and evaporated to dryness. The residue is taken up in a miinmum quantity of warm methanol and the desired product is precipitated by cooling and/or evaporating, optionally with isopropanol as an antisolvent. The crystalline product obtained thereby is filtered, washed with acetone, and dried.

To isolate the $\alpha$-amino-heterocyclic desacetoxy cephalosporin product, the intermediate product obtained from the acylation above can be treated in a conventional manner to remove the protective blocking group from the $\alpha$-amino function, suitably by hydrogenation under mild conditions in the presence of a palladium catalyst, or by exposure to mild acid conditions for a short time (e.g., formic acid at about room temperature for about 1 to 5 hours). This intermediate product may also be treated with trifluoroacetic acid to remove the blocking group and to form the trifluoroacetic acid salt of the desired $\alpha$-amino-heterocyclic - $\Delta^3$ - desacetoxycephalosporin compound. The trifluoroacetic acid salt group may be removed and the zwitterion form of the product formed by treating this acid salt with a suitable anion exchange resin in a base or acetate form by conventional methods. Anion exchange resins suitable for this purpose include the weak anion exchange materials such as the resins sold under the trade names "Amberlite IRA–400," "Dowex 1" or "De-acidite-FF."

Illustratively, a suitable organic amine anion exchange resin which may be used in preparing the compounds of this invention include those marketed by Rohm and Haas Co. under the trade names "Amberlite LA–1" and "Amberlite LA–2" and described in U.S. Pat. 2,870,207. "Amberlite LA–1" anion exchange resin is a member of a family of high molecular weight liquid secondary amines, water insoluble, but readily soluble in hydrocarbons and other non-aqueous solvents. "Amberlite LA–1" resin, e.g., has a molecular weight range of about 353 to 395, and a structural configuration consisting of two aliphatic chains attached to a nitrogen atom, a structure responsible for its excellent solubility in organic solvents and extremely low solubility in aqueous solutions. These solubility characteristics together with the ability of secondary amines to react with acids to form the corresponding amine salts, make the resin effective for the removal of acidic constituents from an aqueous solution.

Some of the $\alpha$-amino-heterocyclic acetic acid compounds, which as such, or in a form suitable for acylating 7-ADCA, such as in the acyl halide or mixed anhydride, contain asymmetric carbon atoms and thus may exist in optically active isomeric forms. These stereoisomeric compounds may be used as separated isomers or as various stereoisomeric mixtures of the optical isomers to prepare the compounds of this invention. An example of mixed compounds of this invention is a stereoisomeric mixture of 7-[D,L-2'-amino-(2'-thienyl)acetamido] - 3 - methyl-$\Delta^3$-cephem-4-carboxylic acid which mixture can be prepared, e.g., by reacting 7-ADCA with mixtures of 2-(D- and L- amino-(2'-thienyl)acetic acid reactive variants, as indicated above. When the separate optical isomers of these cephalosporin compounds is desired, the selected 2-[DL-amino]-(heterocyclic acetic acid isomeric mixture starting material can be resolved in a convetnional manner such as by reacting the free acid with cinchonine, strychnine, brucine, or the like, then fractionally crystallizing the salts formed to separate the diastereoisomeric salts, and then separately acidifying the separated isomer salts to liberate the desired optically active D- or L-acid. Each of the D- and L-2-(amino-2-heterocyclic)acetic acids thus obtained, can be employed as such for the 7-ADCA acylation with a carbodiimide, or may be converted by conventional methods into the corresponding acid halide or mixed anhydride, care being exercised to avoid extremes to conditions which might produce racemization.

The acids and salts exhibit the ability in greater or lesser degree to destroy or inhibit the growth of many microorganisms, among which are the Staphylococci, the Streptococci, and the Bacilli. Numerous uses for the compounds will thus be apparent from the art; e.g., as topical sterilants. The products of the invention are additionally useful as intermediates for the synthesis of still newer antibiotic substances, in particular certain derivatives of cephalosporin C.

The structures of the compounds of the present invention have been proved by way of their infrared, ultraviolet, and nuclear magnetic resonance spectra. They are conveniently analyzed by the method of Ford, Analytical Chemistry, 19, 1004 (1946), which is based upon the quantitative determination of the $\beta$-lactam moiety of the molecule via reaction with hydroxylamine. Their antibiotic potencies are readily determined against a standard organism such as *Staphylococcus aureus* 209 P by appropriate modifications of the paper disc plate methods of Higgens et al., Antibiotics and Chemotherapy, 3, 50–54 (1953) and Loo et al., Journal of Bacteriology, 50, 701–709 (1945).

The invention will be more fully understood from the following operating examples:

EXAMPLE 1

7-amino-3-methyl-$\Delta^3$-cephem-4-carboxylic acid (also called 7-aminodesacetoxycephalosporanic acid) was prepared by the method described in the Journal of Medicinal Chemistry 7, 117–119 (1964).

A solution of 4.8 g. (0.018 mole) of partially resolved 2 - t - butoxycarboxamido - 2(2' - thienyl)acetic acid ($[\alpha]_D = -78.5°$, C=1.0 in ethanol) and 1.829 (0.018 mole) of triethylamine in 75 ml. of tetrahydrofuran was stirred at $-5°$. To this solution was added 2.52 g. (0.018 mole) of isobutyl chloroformate with continued stirring and cooling to form the mixed anhydride. A solution of 7-aminodesacetoxycephalosporanic acid, 4.0 g. (0.019 mole), in 100 ml. of 50 percent aqueous tetrahydrofuran was prepared by the addition of triethylamine to pH 8. This solution was cooled and added to the previously prepared mixed anhydride. After stirring one hour at 0°, the cooling-bath was removed while the reaction was stirred an additional two hours. After addition of water and ethyl acetate, the mixture was cooled while adding 6 N HCl to a pH of 2.5. The ethyl acetate layer was shaken with water, then dried with magnesium sulfate and evaporated to dryness. The residue was dissolved in diethyl ether and precipitated by the addition of Skelly B. The solid was collected, washed with Skelly B and dried in a vacuum oven, yielding 3.67 g. of 7-[2'-t-butoxycarboxamido - 2' - (2''-thienyl)acetamido] - 3 - methyl-3-cephem-4-carboxylic acid. Ultraviolet and titration data for this compound were consistent with expected values. The t-butoxycarbonyl protecting group was removed by dissolving 3.5 g. of this compound in 12 ml. of cold trifluoroacetic acid. This solution was added to 400 ml. of ether to precipitate the trifluoroacetic acid salt of 7-[2'-amino - 2' - (2'' - thienyl)acetamido]-3-methyl-3-cephem-4-carboxylic acid in a yield of 2.37 g. after washing with ether and vacuum drying. Moore-Stein amino acid analysis showed the ratio of D and L epimers to be about 3:1. Smaller peaks were also seen for 2-thienylglycine and 7-aminodesacetoxycephalosporanic acid.

A 2 g. portion of the trifluoroacetic acid salt was dissolved in 6 ml. of water. After overlayering with 2 ml. of methyl isobutyl ketone, a solution of 5 ml. of 25 percent LA-1 (acetate form) in methyl isobutyl ketone was added with stirring. After separation of layers and stirring with a fresh portion of LA-1, layers were again separated and a layer of methyl isobutyl ketone added. Crystals began to separate from the aqueous layer. After one hour, the solid was collected, washed with water and methyl isobutyl ketone and dried in vacuum, yielding 400 mg. of white solid. The Moore-Stein amino acid analysis showed this material to be about 75 percent the less active L epimer of 7-[2'-amino - 2' - (2''-thienyl)-acetamido]-3-methyl-3-cephem-4-carboxylic acid. Ultraviolet, titration and NMR data confirmed the structure of this compound.

The filtrate from above was diluted with acetonitrle. After standing overnight, the solid was collected and vacuum dried, yielding 580 mg. The Moore-Stein amino acid analysis showed this crop to contain 85 percent of the active D epimer. It had ultraviolet maxima at 234 and 260 mμ (ε 12,700 and 7300) and gave pKa values of 5.25 and 6.8 with an apparent molecular weight of 410 (calcd. for monohydrate 371).

EXAMPLE 2

A solution of 1.1 g. (0.005 mole) of 7-aminodesacetoxycephalosporanic acid in 100 ml. of 50 percent aqueous acetone was prepared by the addition of 0.8 g. of NaHCO₃. The solution was stirred in an ice bath and 1.0 g. (0.005 mole) of 2-thienylmercapto acetyl chloride was added. After stirring for a total of 1.5 hours in the cold, the reaction solution was overlayered with ethyl acetate and the pH was adjusted to 2.0 with concentrated hydrochloric acid. The ethyl acetate layer was dried with magnesium sulfate and evaporated to dryness. The residue was dissolved in an ethanol-methanol mixture, to which was added to a solution of potassium acetate in ethanol. After cooling the solid was collected and recrystallized from a mixture of methanol and isopropanol. A yield of 1.32 g. of the potassium salt of 7-(2'-thienylmercaptoacetamido)-3-methyl-3-cephem-4-carboxylic acid was obtained. This compound showed ultraviolet maxima at 235 and 258 mμ (ε 12,000 and 9850) and had a pKa value of 5.75 with an apparent molecular weight of 426 (calcd. 408).

EXAMPLE 3

Following the procedure of Example 1, the following additional compounds within the scope of the invention can also be prepared by reacting 7-ADCA, or an ester or amide form thereof, with the indicated α-amino-α-heterocyclic-acetic acids or reactive variants thereof having the amino group protected, and then removing the protecting group by conventional procedures.

7-(α-amino-α-(2'-furyl)acetamido)-3-methyl-Δ³-cephem-4-carboxylic acid from α-furyl-α-aminoacetic acid, 7-[α-amino-α-(2'-benzothienyl)acetamido]-3-methyl-Δ³-cephem-4-carboxylic acid from α-benzothienyl-α-aminoacetic acid, 7-[α-amino-α-(2'-furyloxyacetamido]-3-methyl-Δ³-cephem-4-carboxylic acid from α-furyloxy-α-amino-acetic acid, and 7-[α-amino-α-(2'-benzofurylacetamido]-3-methyl-Δ³-cephem-4-carboxylic acid from α-benzofuryl-α-aminoacetic acid.

We claim:
1. A compound having the structure

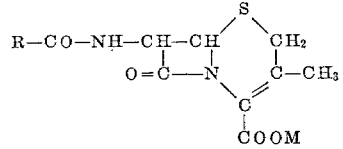

where R is a member of the group represented by the following formulas:

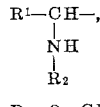

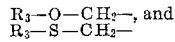

$R^1$ is thienyl, furyl, benzothienyl, or benzofuryl;
$R^2$ is hydrogen or methyl; and
$R^3$ is thienyl, furyl, benzothienyl, benzofuryl, and
M is hydrogen, a pharmaceutically acceptable cation, $C_1$ to $C_4$ alkyl, $C_4$ to $C_7$-cycloalkyl, or phenyl or denotes an inner salt with the amino group of R when R is

2. A compound as in claim 1, said compound being 7-(α-amino-2-thienylacetamido) - 3- methyl - Δ³ - cephem-4-carboxylic acid, or a pharmaceutically acceptable salt thereof.

3. A compound as in claim 1, said compound being 7-(α-thienylmercaptoacetamido) - 3 - methyl - Δ³-cephem-4-carboxylic acid, or a pharmaceutically acceptable salt thereof.

No references cited.

NICHOLAS S. RIZZO, Primary Examiner

U.S. Cl. X.R.

260—999